(12) United States Patent
Kang et al.

(10) Patent No.: US 8,914,808 B2
(45) Date of Patent: Dec. 16, 2014

(54) APPARATUS AND METHOD FOR DYNAMICALLY RECONFIGURING STATE OF APPLICATION PROGRAM IN A MANY-CORE SYSTEM

(75) Inventors: Dong In Kang, Annandale, VA (US); Mi Kyung Kang, Jeju-do (KR); Jae Don Lee, Gyeonggi-do (KR); Seung Won Lee, Gyeonggi-do (KR); Shi Hwa Lee, Seoul (KR)

(73) Assignees: Samsung Electronics Co., Ltd., Suwon-Si (KR); University of Southern California, Los Angeles, CA (US)

( * ) Notice: Subject to any disclaimer, the term of this patent is extended or adjusted under 35 U.S.C. 154(b) by 208 days.

(21) Appl. No.: 13/297,744

(22) Filed: Nov. 16, 2011

(65) Prior Publication Data

US 2012/0151502 A1    Jun. 14, 2012

(30) Foreign Application Priority Data

Dec. 14, 2010   (KR) ........................ 10-2010-0127408

(51) Int. Cl.
*G06F 13/00*   (2006.01)
*G06F 11/34*   (2006.01)
*G06F 9/44*    (2006.01)

(52) U.S. Cl.
CPC ............. *G06F 11/3433* (2013.01); *G06F 8/76* (2013.01)
USPC ......................................................... 719/313

(58) Field of Classification Search
CPC ...................................................... G06F 9/546
USPC ......................................................... 719/313
See application file for complete search history.

(56) References Cited

U.S. PATENT DOCUMENTS

| | | | |
|---|---|---|---|
| 7,730,246 B2 * | 6/2010 | Murty et al. | 710/242 |
| 7,734,895 B1 | 6/2010 | Agarwal et al. | |
| 2008/0177823 A1 * | 7/2008 | Benhase et al. | 709/202 |
| 2009/0037367 A1 | 2/2009 | Wein | |
| 2011/0179477 A1 * | 7/2011 | Starnes et al. | 726/9 |
| 2012/0110570 A1 * | 5/2012 | Jacobson et al. | 718/1 |

FOREIGN PATENT DOCUMENTS

| | | |
|---|---|---|
| FR | 2854260 | 10/2004 |
| JP | 06-119300 | 4/1994 |
| JP | 2006-092554 | 4/2006 |
| KR | 10-2009-0061177 | 6/2009 |
| KR | 10-2010-0069551 | 6/2010 |

OTHER PUBLICATIONS

R. Snelick et al., "Synthetic-Perturbation Techniques For Screening Shared Memory Programs," Software Practice & Experience, Wiley & Sons, vol. 24, No. 8, Aug. 1994, pp. 679-701, XP000655467.
Extended European Search Report dated Jun. 30, 2014 from European Patent Application No. 11193126.7, 8 pages.

* cited by examiner

*Primary Examiner* — Andy Ho
(74) *Attorney, Agent, or Firm* — Staas & Halsey LLP

(57) ABSTRACT

An apparatus and method for dynamically reconfiguring a state of an application program in a many-core system is described. The apparatus may receive registration information from an application program, in response to a state change of the application program, and may process the state change of the application program based on the received registration information.

20 Claims, 5 Drawing Sheets

100

APPARATUS AND METHOD FOR DYNAMICALLY RECONFIGURING STATE OF APPLICATION PROGRAM IN A MANY-CORE SYSTEM

CROSS-REFERENCE TO RELATED APPLICATIONS

This application claims the benefit of Korean Patent Application No. 10-2010-0127408, filed on Dec. 14, 2010, in the Korean Intellectual Property Office, the disclosure of which is incorporated herein by reference.

BACKGROUND

1. Field

Example embodiments of the following description relate to management of an application program in a system configured with a plurality of cores, and more particularly, to a technical aspect that an application program registers and transfers, to a runtime manager (RTM), a morphing instance and performance information of the application program, and the RTM optimizes an operation of the application program using measured system information and information of the application program.

2. Description of the Related Art

One of the most noticeable trends in the design of microprocessors may be the utilization of multi-core processors. Since the advent of dual-core products, a movement toward the use of multi-core processors has become more prevalent, with the development of many-core processors, which utilize a large number of core processors, arising.

Historically, multi-core architecture came about as the chip density of processors has increased. For example, the number of on-chip processing resources has increased based on Moore's law.

Conventional multi-core chips can include about 10 cores, however it is expected that hundreds of cores can be included in a single chip in the near future. As the use of multi-core architecture is becoming more common, parallel processing is being increasingly performed in personal computers (PCs), as well as in super computers, including clusters, and even in embedded systems.

Similar to cluster computing, a plurality of applications need to share computing resources in multiple cores, and there are various computing resource requirements of an application program operating in multiple cores. Additionally, in a dynamic environment, idle resources of a system are frequently changed, and requirements of the application program are also changed during execution of the application program. Traditional static parallelism of the application program tends not to achieve good performance in the dynamic environment.

SUMMARY

The foregoing and/or other aspects are achieved by providing an apparatus for dynamically reconfiguring a state of an application program in a many-core system, the apparatus including a registration unit to receive registration information from an application program, in response to a state change of the application program, and a many-core runtime management unit to process the state change of the application program based on the received registration information.

The foregoing and/or other aspects are achieved by providing a method of dynamically reconfiguring a state of an application program in a many-core system, the apparatus including receiving registration information from an application program, in response to a state change of the application program, monitoring at least one of a performance of the application program and the state of the application program, and processing the state change of the application program based on at least one of the received registration information and a monitoring result obtained by the monitoring.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the example embodiments, taken in conjunction with the accompanying drawings of which.

DETAILED DESCRIPTION

Figure 1:
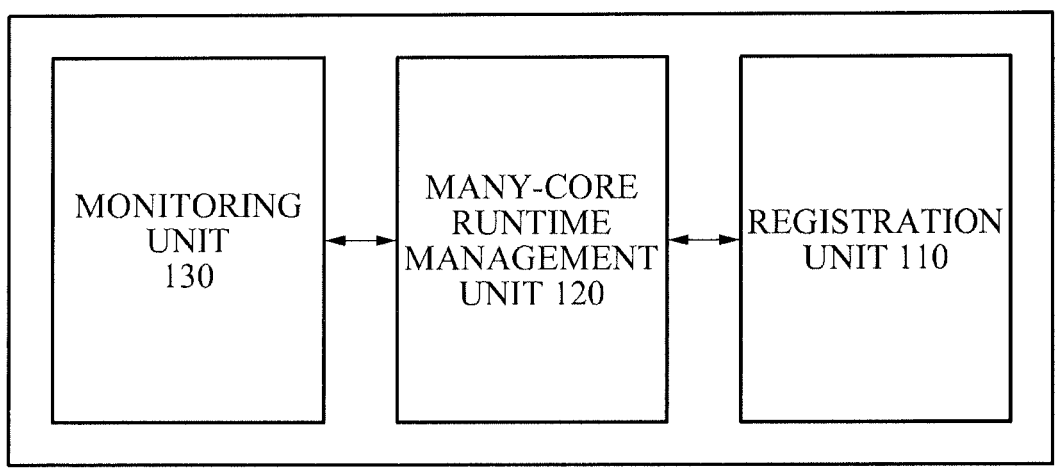
FIG. 1 illustrates a block diagram of an apparatus for dynamically reconfiguring a state of an application program in a many-core system according to example embodiments.

Reference will now be made in detail to example embodiments, examples of which are illustrated in the accompanying drawings, wherein like reference numerals refer to like elements throughout. Example embodiments are described below to explain the present disclosure by referring to the figures.

FIG. 1 illustrates a block diagram of an apparatus 100 for dynamically reconfiguring a state of an application program in a many-core system according to example embodiments.

The apparatus 100 of FIG. 1 may include a registration unit 110, a many-core runtime management unit 120, and a monitoring unit 130.

The registration unit 110 may receive registration information from the application program, in response to a state reconfiguration of the application program, that is, in response to a state change of the application program.

The state reconfiguration of the application program may be processed based on a monitored performance of the application program, using a predetermined instance at a predetermined time by an algorithm defined in advance, so that the application program may achieve the best performance.

Hereinafter, the state reconfiguration of the application program, or the state change of the application program will be referred to as "morphing of the application program".

The many-core runtime management unit 120 may instruct and process morphing of the application program, based on the received registration information, by using a runtime manager (RTM).

The RTM may verify a morphing range, and characteristics of each morphing from the application program.

The application program may have various types of morphing instance sets that may change themselves.

The many-core runtime management unit 120 may manage system resources, and may determine resource allocation, scheduling, and morphing of the application program, using the RTM.

The RTM may monitor a performance of the application program. When the application program needs to be changed, the RTM may instruct the application program to perform morphing. Accordingly, the RTM may be operated in connection with the monitoring unit 130.

The many-core runtime management unit 120 may change at least one algorithm corresponding to the application program, or may divide data connected with the application program, to process the state change of the application program.

The monitoring unit 130 may monitor at least one of the performance and the state of the application program.

Accordingly, the many-core runtime management unit 120 may process the morphing of the application program, based on the received registration information and a monitoring result obtained by the monitoring unit 130.

First, the registration unit 110 will be further described.

Figure 2:
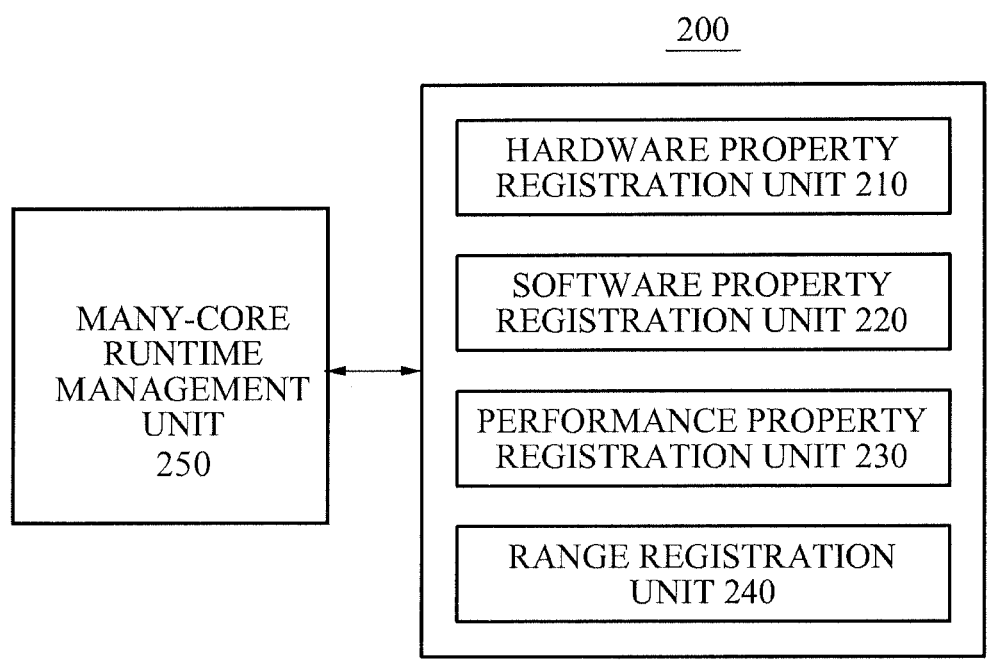
FIG. 2 illustrates a block diagram of a registration unit according to example embodiments.

FIG. 2 illustrates a block diagram of a registration unit 200 according to example embodiments.

The registration unit 200 of FIG. 2 may include a hardware property registration unit 210, a software property registration unit 220, a performance property registration unit 230, and a range registration unit 240.

To perform the morphing, an application program needs to provide an RTM of a many-core runtime management unit 250 with registration information, such as range information, property information, and the like. Here, the range information and the property information may be used for the state change of the application program. The registration unit 200 may receive the registration information from the application program.

Specifically, the hardware property registration unit 210 may receive registration information associated with a hardware property, and the software property registration unit 220 may receive registration information associated with a software property.

Similarly, the performance property registration unit 230 may receive registration information associated with a performance property. The range registration unit 240 may receive registration information regarding a morphing range where the application program is morphable.

The range information may include at least one of hardware property information, software property information, and performance information that correspond to the application program.

The hardware property information may include at least one of information on a usage of a scratchpad memory (SPM), information on a total memory usage, information on a usage of a central processing unit (CPU), network usage information, and bus usage information.

Additionally, the software property information may include at least one of information on a number of threads corresponding to the application program, information on a parallelism overhead, information on a communication density, information on a memory access density, and information on a cache usage.

Furthermore, the performance information may include information regarding a current performance of the application program that is received from the application program.

Figure 3:
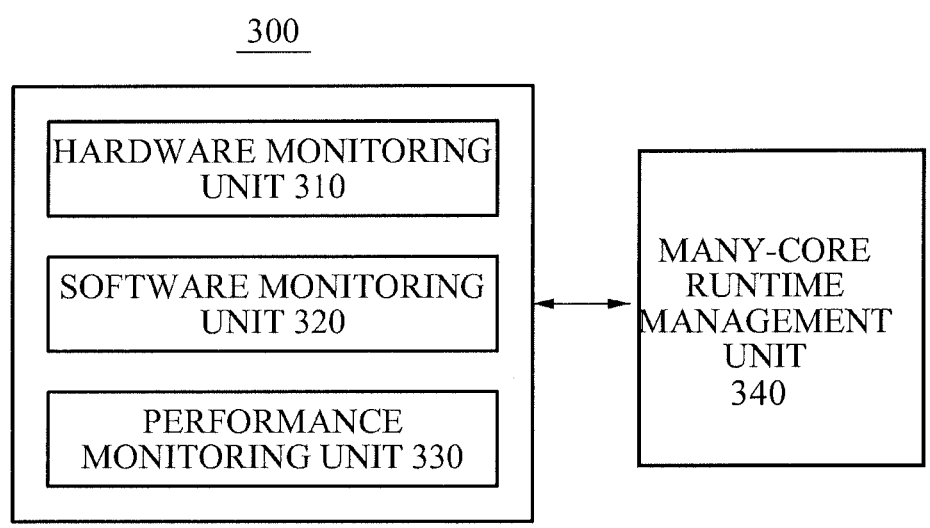
FIG. 3 illustrates a block diagram of a monitoring unit according to example embodiments.

FIG. 3 illustrates a block diagram of a monitoring unit 300 according to example embodiments.

The monitoring unit 300 of FIG. 3 may include a hardware monitoring unit 310, a software monitoring unit 320, and a performance monitoring unit 330. The hardware monitoring unit 310 may monitor hardware corresponding to an application program, and the software monitoring unit 320 may monitor software corresponding to the application program. Additionally, the performance monitoring unit 330 may monitor a performance of the application program.

A many-core runtime management unit 340 according to example embodiments may instruct the application program to perform morphing of the application program, based on a result of monitoring at least one of the performance and state of the application program.

In other words, an RTM of the many-core runtime management unit 340 may monitor the performance of the application program, and a state of a system, using the monitoring unit 300.

The application program according to example embodiments may form a morphing instance set by either implementing various algorithms or changing a data division scheme. A morphing instance of the application program may be compiled by actual hard coding, or may be dynamically generated by a source code generator and compiled in a runtime.

An application program written as described above may need to notify the RTM of a changeable range of the application program. The changeable range may be expressed by, for example, a hardware property, a software property, a performance property, and a morphing range. The hardware property may include, for example, an SPM usage, a total memory usage, a CPU usage, a network usage, a bus usage, and the like. Here, the SPM usage may enable each morphing instance to achieve an optimal performance.

In other words, the RTM may monitor a performance of hardware using the monitoring unit 300, and may select a morphing instance based on a state of the hardware.

The software property may include, for example, a number of threads used by the morphing instance, a parallelism overhead, a communication density, a memory access density, a cache usage, and the like.

A predetermined instance may have a large overhead for initial parallelism, but may have a small overhead for synchronization. Another instance may have a small overhead for initial parallelism, but may have a large overhead for synchronization. The performance property may be information received by the RTM to enable the application program to measure the performance of the application program.

To measure the performance of the application program, a scheme by which the RTM counts a simple heartbeat may be used, or other complex schemes may be registered.

Figure 4:
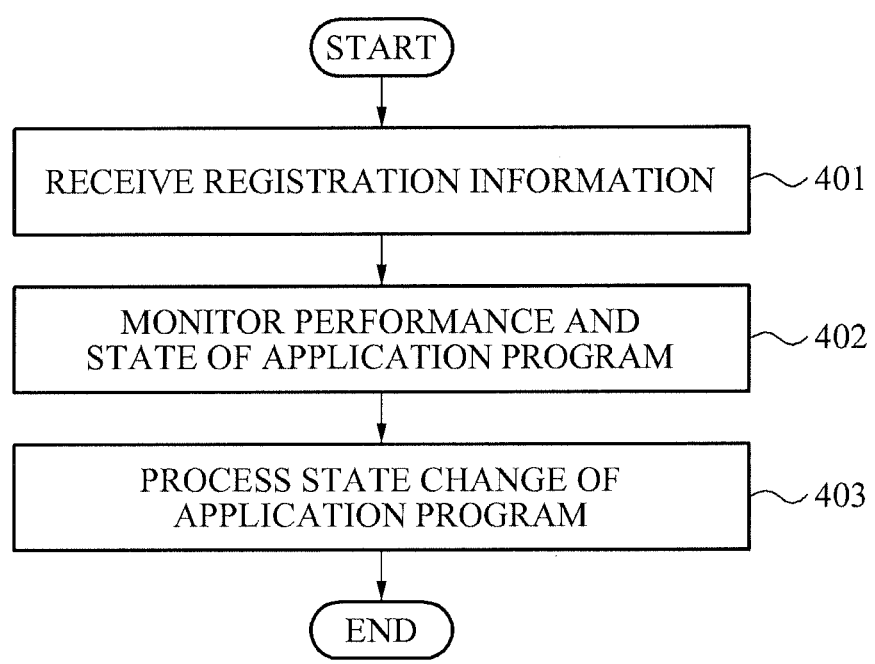
FIG. 4 illustrates a flowchart of a method of dynamically reconfiguring a state of an application program in a many-core system according to example embodiments.

FIG. 4 illustrates a flowchart of a method of dynamically reconfiguring a state of an application program in a many-core system according to example embodiments.

In operation 401, registration information may be received from the application program, in response to a state change of the application program.

Here, the registration information may include at least one of information on a usage of a SPM, information on a total memory usage, information on a usage of a CPU, network usage information, bus usage information, information on a number of threads, information on a parallelism overhead, information on a communication density, information on a memory access density, information on a cache usage, and information regarding a current performance of the application program.

In operation 402, at least one of a performance and a state of the application program may be monitored.

Specifically, the application program may register, in an RTM, a morphing range and characteristics of the application program. The RTM may measure and monitor the performance of the application program.

In operation 403, the state change of the application program, that is, morphing of the application program may be processed based on the received registration information, and a monitoring result obtained in operation 402.

Here, at least one algorithm corresponding to the application program may be changed, or data connected with the application program may be divided.

The RTM may select a suitable morphing time and a suitable morphing instance to morph the application program depending on a change in a state of a system and a change in a performance of the application program, based on the registration information.

Figure 5:
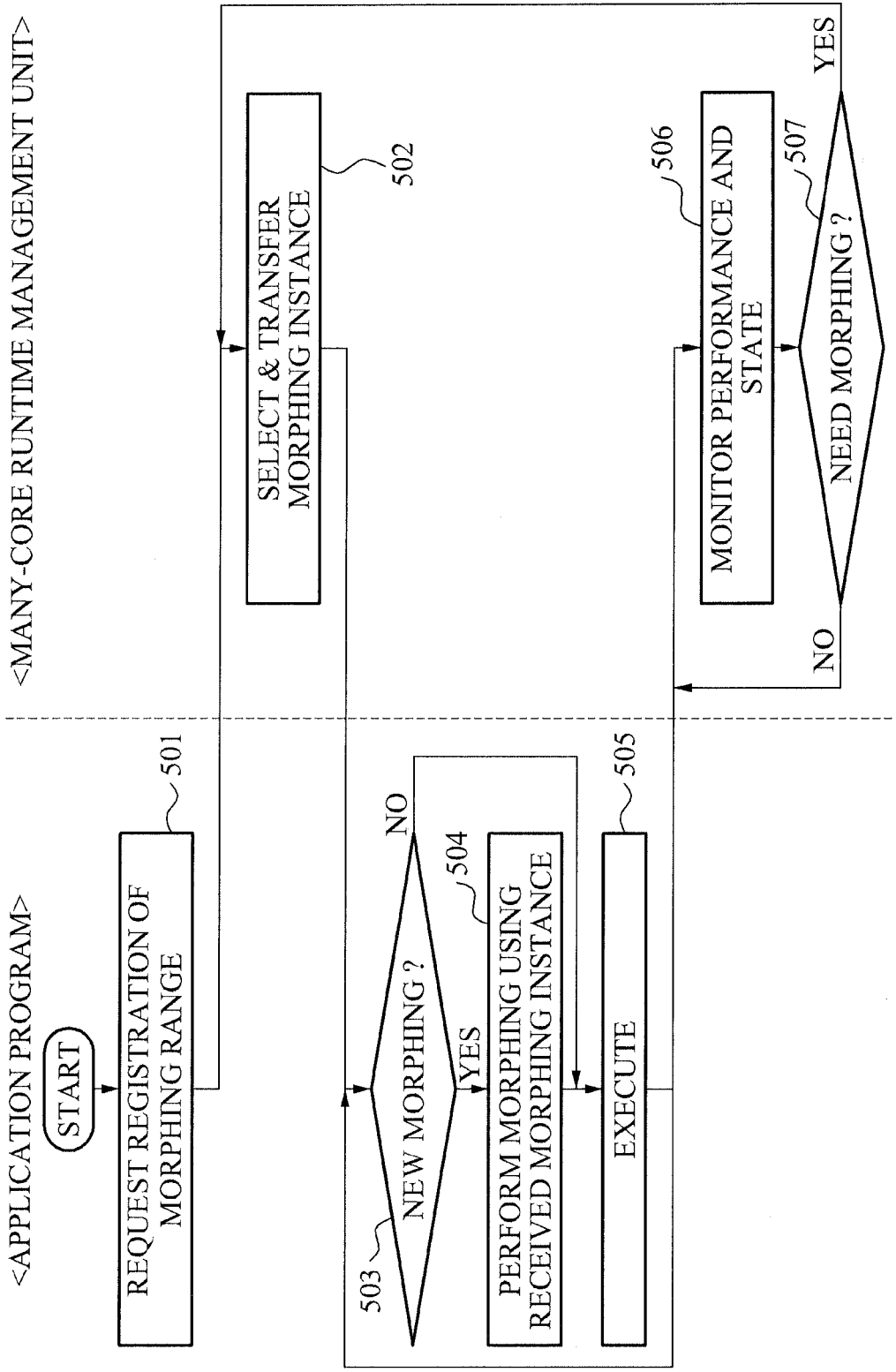
FIG. 5 illustrates a flowchart of operations performed between a many-core runtime management unit and an application program according to example embodiments.

FIG. 5 illustrates a flowchart of operations performed between a many-core runtime management unit and an application program according to example embodiments.

Referring to FIG. 5, when the application program is executed, the application program may request an RTM of the many-core runtime management unit to register a morphing range of the application program, and may register a property of a morphing instance in operation 501.

When instance property information does not exist, the application program may request the RTM to collect information through profiling.

In operation 502, the RTM of the many-core runtime management unit may select the best morphing instance based on a current system status, and may transfer the selected morphing instance to the application program.

In operation 503, the application program may determine, based on the selected morphing instance, whether there is a need to perform new morphing. When the new morphing needs to be performed, the application program may perform the new morphing based on the received morphing instance in operation 504, and may then be executed in operation 505.

Conversely, when there is no new morphing, the application program may be executed in operation 505 directly, without needing to perform the new morphing.

During execution, the application program may frequently transfer a procedure to the RTM, and may determine whether a new morphing instruction is received from the RTM at a determined point. For example, when the new morphing instruction is received, the application program may be morphed to a corresponding state, and may perform an application.

The RTM may monitor a performance of a system, and the state of the application program, using a performance hint and system information in operation 506, and may determine whether morphing needs to be performed in operation 507. Here, the performance hint may be received from the application program to the RTM, and the system information may be measured by the RTM.

When it is determined that the morphing needs to be performed, that is, when a morphing time comes, the RTM may select the best morphing instance, and may instruct the application program to perform the morphing.

Thus, according to example embodiments, it is possible to manage an application program, so that the application program may achieve the best performance in a system including a plurality of cores.

Specifically, an RTM of a system level may function to measure a performance and a system load and accordingly, it is possible to more easily design an application program, and to improve a performance of the application program.

In other words, the application program may be optimized by the RTM and thus, it is possible to use a variety of information of the system level. Additionally, the application program may be optimized by adjusting scheduling or resource allocation in the system level.

In addition, the application program may be optimized during execution of the application program, without a need to interrupt or restart the application program.

The method of dynamically reconfiguring a state of an application program in a many-core system according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

The apparatus and method for dynamically reconfiguring a state of an application program in a many-core system according to the above-described example embodiments may use one or more processors, which may include a microprocessor, central processing unit (CPU), digital signal processor (DSP), or application-specific integrated circuit (ASIC), as well as portions or combinations of these and other processing devices.

The example embodiments described herein refer to flowchart illustrations of the apparatus and method for dynamically reconfiguring a state of an application program in a many-core system. It will be understood that each block of the flowchart illustrations, and combinations of blocks in the flowchart illustrations, can be implemented by computer program instructions. These computer program instructions can be provided to one or more processors of a general purpose computer, special purpose computer, or other programmable data processing apparatus to produce a machine, such that the instructions, which execute via the one or more processors of the computer or other programmable data processing apparatus, may implement the functions specified in the flowchart block or blocks.

Each block of the flowchart illustrations may represent a unit, module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The terms "module", and "unit," as used herein, may refer to, but is not limited to, a software or hardware component, such as a Field Programmable Gate Array (FPGA) or Application Specific Circuit (ASIC), which performs certain tasks. A module or unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. An apparatus for dynamically reconfiguring a state of an application program in a many-core system, the apparatus comprising:
    a registration unit to receive registration information from the application program, in response to a state change of the application program; and
    a many-core runtime management unit to instruct the application program to change the state of the application program, based on the received registration information.

2. The apparatus of claim 1, further comprising:
    a monitoring unit to monitor at least one of a performance of the application program and the state of the application program.

3. The apparatus of claim 2, wherein the many-core runtime management instructs the application program to change the state of the application program, based on a monitoring result obtained by the monitoring unit and the received registration information.

4. The apparatus of claim 2, wherein the monitoring unit comprises:
    a hardware monitoring unit to monitor hardware corresponding to the application program;
    a software monitoring unit to monitor software corresponding to the application program; and
    a performance monitoring unit to monitor the performance of the application program.

5. The apparatus of claim 2, wherein the many-core runtime management unit instructs the application program to change the state of the application program, based on a monitoring result obtained by the monitoring unit.

6. The apparatus of claim 1, wherein the registration information comprises at least one of range information and property information that are used for the state change.

7. The apparatus of claim 6, wherein the range information comprises at least one of hardware property information, software property information, and performance information that correspond to the application program.

8. The apparatus of claim 7, wherein the hardware property information comprises at least one of information on a usage of a scratchpad memory (SPM), information on a total memory usage, information on a usage of a central processing unit (CPU), network usage information, and bus usage information.

9. The apparatus of claim 7, wherein the software property information comprises at least one of information on a number of threads corresponding to the application program, information on a parallelism overhead, information on a communication density, information on a memory access density, and information on a cache usage.

10. The apparatus of claim 1, wherein the performance information comprises information regarding a current performance of the application program that is received from the application program.

11. The apparatus of claim 1, wherein the many-core runtime management unit either changes at least one algorithm corresponding to the application program, or divides data connected with the application program, to process the state change of the application program.

12. The apparatus of claim 1, wherein the many-core runtime management unit determines resource allocation, scheduling, and a state change of the application program using a runtime manager.

13. The apparatus of claim 1, wherein the registration unit comprises:
    a hardware property registration unit to receive registration information associated with a hardware property;
    a software property registration unit to receive registration information associated with a software property;
    a performance property registration unit to receive registration information associated with a performance property; and
    a range registration unit to receive registration information regarding range information to determine when a state change of the application program is possible.

14. The apparatus of claim 1, wherein the state change is performed by hard coding or by dynamically generating code using a source code generator to compile the code in a runtime.

15. A method of dynamically reconfiguring a state of an application program in a many-core system, the method comprising:
    receiving registration information from an application program, in response to a state change of the application program;
    monitoring at least one of a performance of the application program and the state of the application program; and
    instructing the state change of the application program based on at least one of the received registration information and a monitoring result obtained by the monitoring.

16. The method of claim 15, wherein the registration information comprises at least one of information on a usage of a scratchpad memory (SPM), information on a total memory usage, information on a usage of a central processing unit (CPU), network usage information, bus usage information, information on a number of threads, information on a parallelism overhead, information on a communication density, information on a memory access density, information on a cache usage, and information regarding a current performance of the application program.

17. The method of claim 15, wherein the instructing comprises either changing at least one algorithm corresponding to the application program, or dividing data connected with the application program.

18. A non-transitory computer readable recording medium to store a program, that when executed, causes a computer to implement the method of claim 15.

19. A method for dynamically reconfiguring a state of an application program in a many-core system, the method comprising:
    registering a morphing range of the application program with a many-core runtime management unit;
    receiving a morphing instance selected by the many-core runtime management unit;

determining whether to perform a new morphing based on the selected morphing instance;

performing a new morphing when it is determined based on the selected morphing instance there is a need to perform new morphing; and executing the application program.

20. The method of claim 19, wherein the application program registers a property of a morphing instance with the many-core runtime management unit, and when instance property information does not exist, the method further comprises: requesting the many-core runtime management unit to collect morphing instance information through profiling.

\* \* \* \* \*